(12) United States Patent
Kim

(10) Patent No.: US 8,508,510 B2
(45) Date of Patent: Aug. 13, 2013

(54) STYLUS PEN FOR CAPACITIVE TYPE TOUCH PANEL

(75) Inventor: Sang-Uk Kim, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 247 days.

(21) Appl. No.: 12/979,935

(22) Filed: Dec. 28, 2010

(65) Prior Publication Data
US 2012/0026127 A1   Feb. 2, 2012

(30) Foreign Application Priority Data

Jul. 27, 2010 (KR) .......................... 10-2010-0072430

(51) Int. Cl.
*G06F 3/033* (2006.01)
(52) U.S. Cl.
USPC ...................... 345/179; 178/19.01; 178/19.03
(58) Field of Classification Search
USPC .......................................................... 345/174
See application file for complete search history.

(56) References Cited

U.S. PATENT DOCUMENTS

| | | | | |
|---|---|---|---|---|
| 4,031,358 A | * | 6/1977 | Thorniley | 235/472.03 |
| 6,113,295 A | * | 9/2000 | Bordelon | 401/195 |
| 8,384,697 B2 | * | 2/2013 | Sung | 345/179 |
| 2009/0262637 A1 | * | 10/2009 | Badaye et al. | 369/126 |
| 2010/0006350 A1 | * | 1/2010 | Elias | 178/18.06 |
| 2010/0225614 A1 | * | 9/2010 | Sung | 345/174 |

FOREIGN PATENT DOCUMENTS

| | | | |
|---|---|---|---|
| JP | 57152034 A | * | 9/1982 |
| KR | 10-2005-0049150 A | | 5/2005 |
| KR | 10-2009-0003798 A | | 1/2009 |

OTHER PUBLICATIONS http://www.gottabemobile.com/2010/02/25/spill-some-ink-with-the-dagi-capacitive-stylus/ , GottaBeMOBILE Mobile News and Reviews, Sumocat, dated Feb. 25,2010, downloaded Apr. 19, 2013.*

* cited by examiner

*Primary Examiner* — Dorothy Harris
(74) *Attorney, Agent, or Firm* — Christie, Parker & Hale, LLP

(57) ABSTRACT

A stylus pen for a capacitive touch screen that allows delicate input. The stylus pen for the capacitive touch panel includes: a pen having a body extending longitudinally and an input portion positioned at one end of the body to provide touch input to the capacitive type touch panel, wherein the input portion comprises: a center conductor having a connection portion that is combined with the body and a tip portion having a cross-sectional area that is smaller than the cross-sectional area of the connection portion that is connected to the body; and a transparent electrode plate that is connected to an end of the tip portion of the center conductor opposite an end connected to the connection portion, wherein the transparent electrode plate has a cross-sectional area larger than the tip portion while defining a touch surface.

9 Claims, 4 Drawing Sheets

STYLUS PEN FOR CAPACITIVE TYPE TOUCH PANEL

CROSS-REFERENCE TO RELATED APPLICATION

This application claims priority to and the benefit of Korean Patent Application No. 10-2010-0072430, filed on Jul. 27, 2010, in the Korean Intellectual Property Office, the entire content of which is incorporated herein by reference.

BACKGROUND

1. Field of the Invention

An embodiment relates to a stylus pen for a capacitive type touch screen, particularly a stylus pen for a capacitive type touch screen that makes it possible to perform precise input.

2. Description of the Related Art

Recently, as touch panels that can replace independent input devices, such as a keyboard and a mouse, by converting positions directly contacting a person's hand or an object into electrical signals, on the front face of image display devices are increasingly used, possible uses of stylus pens for the touch screen panels are rapidly increasing.

A stylus pen is usually designed to be thin relative to a person's hands, and particularly, the tip portion for touch input is designed to be thin, such that it is useful to perform precise input to the touch panel.

However, there is a limit to the extent to which it is possible to make the tip portion of the stylus pen thin and still be useful, particularly in a stylus pen used for a capacitive type touch panel. A sufficient area of the tip portion is required to provide capacitance change for the capacitive type touch panel so that the capacitance touch panel is able to sense touch input.

Therefore, a stylus pen to provide touch input to a capacitive type touch panel has a relatively large area at the tip portion, such that the stylus pen covers the portion where touch input is applied to the screen. Therefore, when it is required to perform precise input, such as in inputting complicated Chinese characters, a user feels the inconvenience of using the stylus and numerous input errors may occur.

SUMMARY OF THE INVENTION

An embodiment of the present invention provides a stylus pen for a capacitive type touch panel that makes it possible to perform precise input while stably transmitting a touch input.

An aspect of the present invention provides a stylus pen for a capacitive touch panel, which includes: a pen having a body extending longitudinally and an input portion positioned at one end of the body to provide touch input to the capacitive type touch panel, in which the input portion includes; a center conductor having a connection portion that is combined with the body and a tip portion having a cross-sectional area that is smaller than the cross-sectional area of the connection portion that is connected to the body; and a transparent electrode plate that is connected to an end of the tip portion of the center conductor opposite an end connected to the connection portion, wherein the transparent electrode plate has a cross-sectional area larger than the tip portion while defining a touch surface.

In this configuration, the connection portion of the center conductor may have a cylinder shape, and the tip portion may have a cone with the top cut shape which decreases in a cross-sectional area from the connection portion toward the touch surface.

Further, the center conductor may be made of an opaque conductive material.

Further, the center conductor may be made of made of metal or conductive polymer.

Further, the stylus pen for a capacitive touch may further include a transparent reinforcing member covering the end of the tip portion of the center conductor opposite that of the connection portion.

In this configuration, the transparent reinforcing member may be made of a transparent plastic-based material.

Further, the transparent reinforcing member may have a convex end adjacent to the transparent electrode plate.

Further, the connection portion of center conductor may have a cylinder shape, and the tip portion may have a cone with the top cut shape which decreases in a cross-sectional area from the connection portion toward the touch surface, and the transparent electrode plate may be a circular plate having the same diameter as the cylinder shape of the center conductor.

Further, the stylus pen for a capacitive touch panel may include a transparent reinforcing member covering the tip portion of the center conductor, wherein the cylinder shape may be achieved by the connection portion of center conductor, the transparent reinforcing member, and the transparent electrode plate.

According to aspects of the present invention described above, it is possible to ensure sufficient user's view for touch input by reducing the cross-sectional area of the tip portion of the center conductor in the input portion of the pen. Further, it is possible to provide sufficient capacitance change that is enough to sense touch input by ensuring a contact area with the touch screen, by forming the touch surface, by connecting the transparent electrode plate having a larger cross-sectional area than the center conductor at the tip portion, at the tip portion of the center conductor.

Therefore, it is possible to achieve a stylus pen for a capacitive touch panel that makes it possible to perform precise input while stably transmitting touch input.

Further, when the transparent reinforcing member covering the side of the tip portion of the center conductor which decreases in volume, it is possible to ensure rigidity of the stylus pen for a capacitive touch panel.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1:
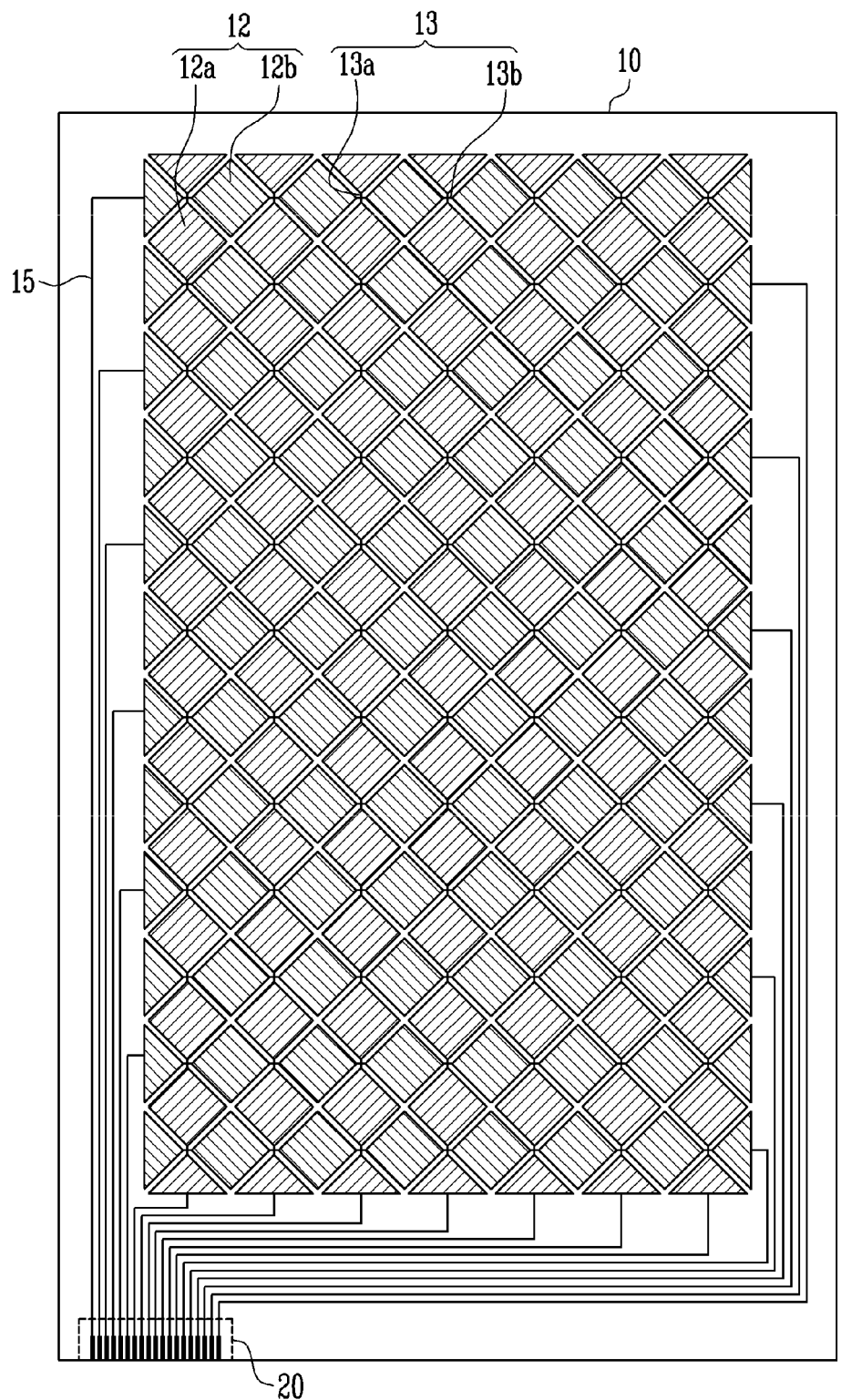
FIG. 1 is a plan view showing an example of a capacitive type touch screen panel.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Hereinafter, embodiments of the present invention will be described in detail with reference to the accompanying drawings.

Figure 2:
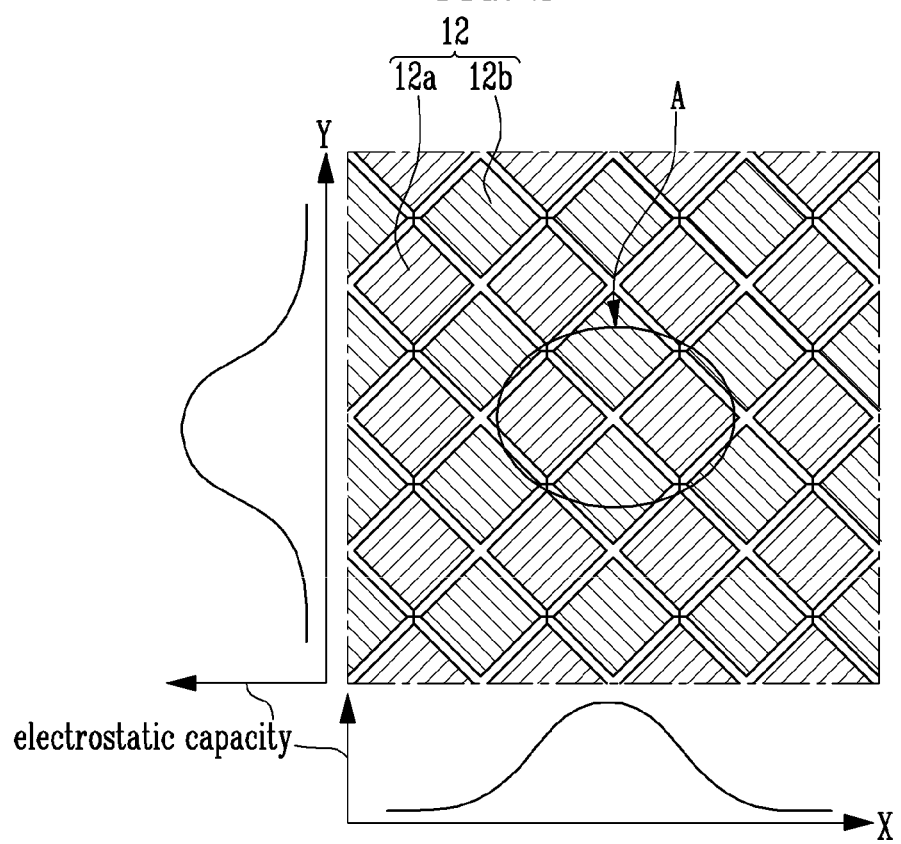
FIG. 2 is a plan view illustrating the operational principle of the capacitive type touch panel shown in FIG. 1.

FIG. 1 is a plan view showing an example of a capacitive type touch screen panel. Further, FIG. 2 is a plan view illustrating the operational principle of the capacitive type touch panel shown in FIG. 1.

First, referring to FIG. 1, a capacitive type touch panel includes a transparent substrate 10, sensing cells 12 and connection patterns 13 which are formed in a touch active region on one side of the transparent substrate 10, and position detection lines 15 formed in a non-touch active region around the touch active region on the same side of the transparent substrate 10 and connecting the sensing cells 12 to an external driving circuit through a pad unit 20.

The sensing cells 12 include first sensing cells 12a formed to be connected in a first direction in the touch active region and second sensing cells 12b formed to be connected in a second direction crossing (e.g., not limited to being perpendicular to) the first direction in the touch active region.

In particular, FIG. 1 shows an example of a capacitive type touch panel, in which the first sensing cells 12a and the second sensing cells 12b are alternately distributed without overlapping each other in the touch active region. As such, individual ones of the first sensing cells 12a and the second sensing cells 12b are alternately disposed on the transparent substrate 10.

That is, the first sensing cells 12a are arranged in columns and/or rows, and the first sensing cells 12a arranged in the same column or row (the same column in this embodiment) are connected in the first direction (column direction in this embodiment) by the first connection patterns 13a arranged in the same row or column (column direction in this embodiment). In this configuration, the first sensing cells 12a are connected with the position detection lines 15 in each line in the first direction.

Further, the second sensing cells 12b are arranged in rows and/or columns, and the second sensing cells 12b arranged in the same row or column (the same row in this embodiment) are connected in the second direction (row direction in this embodiment) by the second connection patterns 13b arranged in the same row or column (row direction in this embodiment). In this configuration, the second sensing cells 12b are connected with the position detection lines 15 in each line in the second direction. However, aspects of the present invention are not limited thereto, and the first sensing cells 12a and the second sensing cells 12b may be respectively connected along other suitable directions. Additionally, the first sensing cells 12a and the second sensing cells 12b may be alternately arranged on different layers according to aspects of the present invention.

The first sensing cells 12a and the second sensing cells 12b are made of a transparent material having predetermined transmittance, in order to transmit light from a display panel (not shown) disposed thereunder. For example, the first sensing cells 12a and the second sensing cells 12b may be made of a transparent electrode material, such as ITO or IZO.

The connection patterns 13 include the first connection patterns 13a formed in the first direction to connect the first sensing cells 12a in the first direction and the second connection patterns 13b formed in the second direction to connect the second sensing cells 12b in the second direction.

The position detection lines 15 are connected with the first sensing cells 12a and the second sensing cells 12b, respectively, which are connected in the first direction and the second direction, to connect the cells with an external driving circuit (not shown), such as a position detection circuit, through the pad unit 20.

The position lines 15 are positioned in a touch inactive region around and outside of the edge portions of the touch active region, with the touch active region being a region where images are displayed and may be made from a large range of selected materials. The position lines 15 may be made of a low-resistance material, such as Mo, Ag, Ti, Cu, Al, or Mo/Al/Mo, but this material is different from the transparent electrode material used for making the sensing cells 12.

The touch panel described above is a capacitive type touch panel, in which when a contact object, such as person's hand or a stylus pen, contacts the touch screen panel, a change of electrostatic capacitance corresponding to the contact position is transmitted to the driving circuit (not shown) from the sensing cells 12 through the position detection lines 15 and the pad unit 20.

For example, as shown in FIG. 2, when an object contacts the point A and touch input is provided, the capacitance changes at the contact point.

Accordingly, the capacitance change is transmitted to an X and Y input process circuit (not shown) through the position detection lines 15 and the pad unit 20, and the contact point is determined by analyzing the capacitance change.

Figure 3:
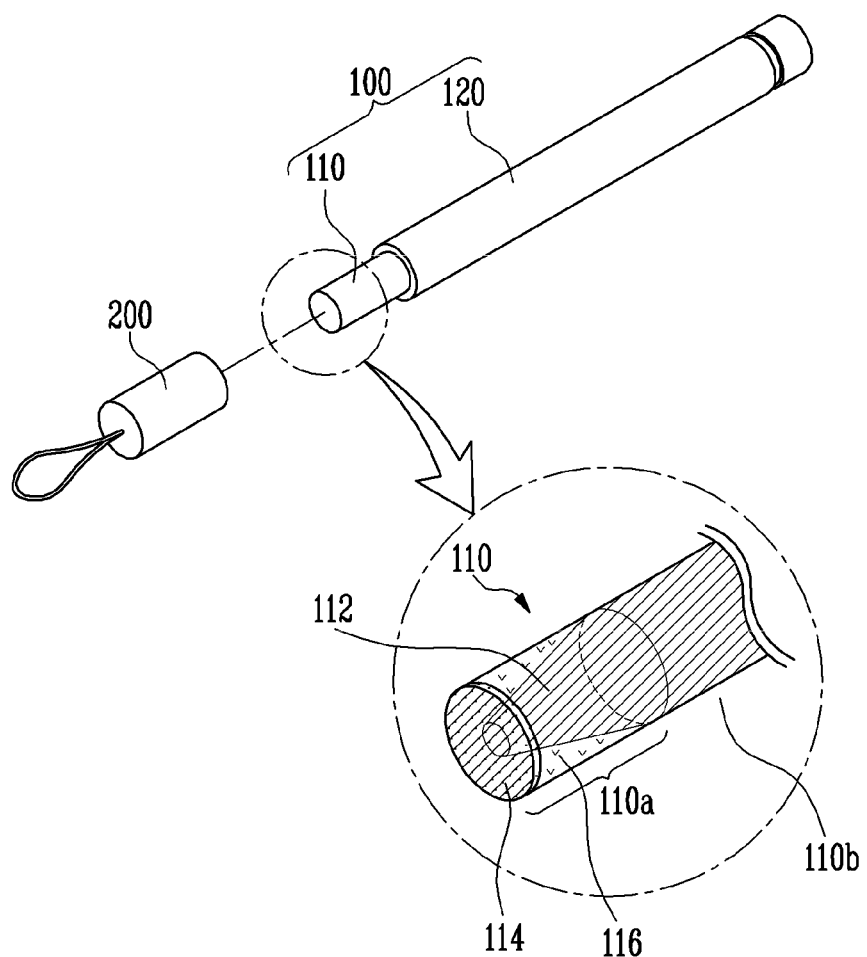
FIG. 3 is a perspective view showing a stylus pen for a capacitive type touch panel according to an embodiment of the present invention.

FIG. 3 is a perspective view showing a stylus pen for a capacitive type touch panel according to an embodiment of the present invention.

Referring to FIG. 3, a stylus pen according to this embodiment is for providing touch input due to a capacitance change to the capacitive type touch panel shown in FIG. 1, and includes a pen 100 having a body 120 extending longitudinally and an input portion 110 positioned at one end of the body 120 to provide touch input to the capacitive type touch panel, and a cap 200 protecting the input portion 110 of the stylus pen. As shown in FIG. 3, the body 120 is in a cylinder shape with a constant first diameter, the input portion 110 is in a cylinder shape with a constant second diameter smaller than the first diameter, and the cap 200, which fits over the input portion 110 as the same constant first diameter as the body 200. However, it is not necessary for the body 120, the input portion 110 or the cap 200 to have constant diameters or have the just described diameters relative to each and alternative forms are possible.

In this configuration, the input portion 110 of the stylus pen 100 includes a center conductor 112 that is connected with the body 120 and a connection portion 110b with a constant cross-sectional area and a tip portion 110a with a cross-sectional area which is smaller than that of the connection portion 110b, and a transparent electrode plate 114 that is connected to an end of the tip portion 110a of the center conductor 112 opposite that of the connection portion 110b and defines a touch surface while having a cross-sectional area larger than the center conductor 112 at the tip portion 110a. In this instance, the transparent electrode plate 114 has a diameter the same as that of the connection portion 110b of the input portion 110 that is not the tip portion 110a.

In more detail, the center conductor 112 is designed to have a volume that is enough to cause capacitance change when there is touch input, and for example, it may have the largest volume in the input portion 110.

The center conductor 112 may be made of a conductive material that can be easily formed in a desired volume, such as a metal or conductive polymer.

However, when the conductive material, such as the metal or conductive polymer has a volume that is enough to cause capacitance change, it may become opaque.

That is, the center conductor 112 may be made of an opaque material, in which the view of the touch screen may be limited by the center conductor 112 from a user's vantage point while touch is inputted by the stylus pen.

Therefore, in order to prevent this problem in the present embodiment, the cross-sectional area of the tip portion 110a of the center conductor 112 adjacent to the touch surface is designed to be smaller than the cross-sectional area of the connection portion 110b with the body 120.

For example, the center conductor 112 may be designed so that the connection portion 110b has a constant diameter, but the tip portion is gradually decreased in width toward the end of the tip portion 110a where touch occurs and opposite the end at which the connection portion 110b is present.

For this purpose, an example of the shape of the tip portion 110a of the center conductor 112 may be a cone with the top cut, as shown in FIG. 3.

In this configuration, the tip portion 110a of the center conductor 112 is designed in a cone with the top cut shape, in which the connection portion 110b connected with the body 120 is formed in a cylinder shape to ensure a volume where the tip portion 110a decreases in cross-sectional area toward the touch surface, such that it is possible to ensure the view of the touch screen, as much as possible, even while the stylus pen is right above the touch screen.

Further, since the transparent electrode plate 114 that is connected with the center conductor 112 and has a cross-sectional area larger than the center conductor 112 at the tip portion 110a, it is possible to ensure a contact area large enough to sense touch input.

For example, the transparent electrode plate 114 may be formed as a circular plate having the same diameter as the connection portion 110b formed in the cylinder shape of the center conductor 112.

Meanwhile, the present invention is not limited thereto and a transparent reinforcing member 116 covering the side of the tip portion 110a of the center conductor 112 may be further provided to ensure sufficient rigidity.

For example, it is possible to maintain a constant diameter cylinder shape for the input portion 110 including the center conductor 112, the transparent reinforcing member 116, and the transparent electrode plate 114, by forming the transparent reinforcing member 116 to fill in the reduced volume of the center conductor 112 at the tip portion 110a.

The transparent reinforcing member 116 is made of a transparent and elastic material, such as a transparent plastic-based material, to ensure rigidity of the input portion 110 without blocking the user's view.

Meanwhile, the body 120 is made of a conductive material that is the same as or different from the center conductor 112 of the input portion 110 such that the stylus pen 100 has the equivalent potential as the user's body.

In this configuration, when the body 120 is made of the same material as the center conductor 112, the body 120 and the center conductor 112 may be integrally formed. When the body 120 is made of a material different from the center conductor 112, the body 120 and the center conductor 112 may be combined by a fastening structure that can be thread-fastened or press-fitted.

Further, when only the conductive material of the input portion 110 can cause sufficient capacitance change that can be sensed by touch input, the body 120 may be made of an insulating material, such as plastic, and combined with the input portion 110 by thread-fastened or press-fitting.

According to the stylus pen for a capacitive touch panel according to this aspect, as described above, it is possible to ensure a sufficient user's view for touch input by reducing the cross-sectional area of the tip portion 110a of the center conductor 112 in the input portion 110 of the pen 100.

Further, it is possible to provide sufficient capacitance change that is enough to sense touch input by ensuring a contact area with the touch screen, by forming the touch surface, by connecting the transparent electrode plate 114 having a larger cross-sectional area than the center conductor 112 at the tip portion 110a, at the end of the tip portion 110a of the center conductor 112 opposite that of the connection portion 110b.

Therefore, it is possible to achieve a stylus pen for a capacitive touch panel that makes it possible to implement precise input while stably transmitting touch input.

Further, when the transparent reinforcing member 116 covers the side of the tip portion 110a of the center conductor 112 which decreases in volume, it is possible to ensure rigidity of the stylus pen for a capacitive touch panel.

Figure 4:
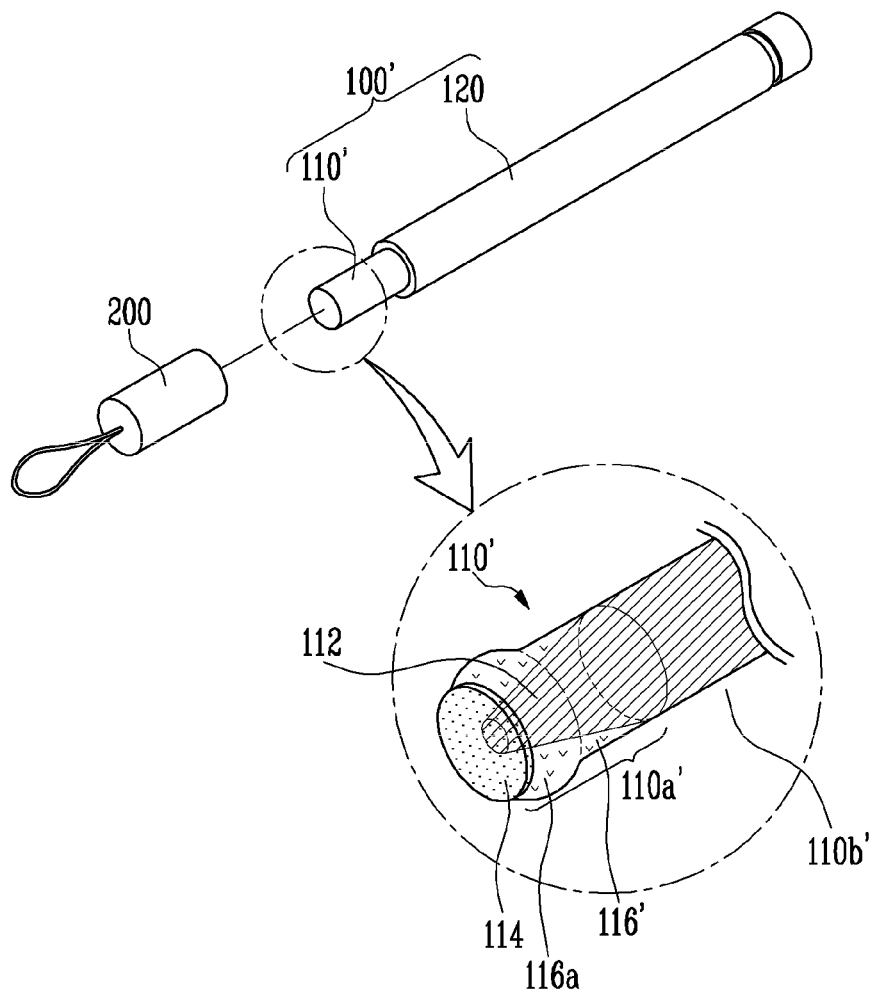
FIG. 4 is a perspective view showing a stylus pen for a capacitive type touch panel according to another embodiment of the present invention.

FIG. 4 is a perspective view showing a stylus pen for a capacitive type touch panel according to another embodiment of the present invention. Similar components to those in FIG. 3 are given the same reference numeral in FIG. 4 and a detailed description is not provided.

Referring to FIG. 4, in a stylus pen according to this embodiment, the input portion 110' has a connection portion 110b', a tip portion 110a' and a transparent reinforcing member 116' having a convex end 116a adjacent to a transparent electrode plate 114.

That is, since the transparent reinforcing member 116' is convex at the region adjacent to the touch surface, the transparent reinforcing member 116' enlarges the image on the touch screen, by forming a convex lens.

Therefore, it is possible to improve convenience of touch input by easily enlarging a desired portion in a screen with small texts or icons, without a specific signal processing procedure.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A stylus pen for a capacitive touch panel, comprising:
a pen having a body extending longitudinally;
an input portion positioned at one end of the body to provide touch input to the capacitive type touch panel, wherein the input portion comprises:
a center conductor having a connection portion that is combined with the body and a tip portion having a cross-sectional area that is smaller than the cross-sectional area of the connection portion that is connected to the body; and
a transparent electrode plate that is connected to an end of the tip portion of the center conductor opposite an end connected to the connection portion, wherein the transparent electrode plate has a cross-sectional area larger than the tip portion while defining a touch surface; and
a transparent reinforcing member covering the end of the tip portion of the center conductor opposite that of the connection portion.

2. The stylus pen for a capacitive touch panel as claimed in claim 1, wherein the connection portion of the center conductor has a cylinder shape and the tip portion has a cone with the top cut shape which decreases in a cross-sectional area from the connection portion toward the touch surface.

3. The stylus pen for a capacitive touch panel as claimed in claim 1, wherein the center conductor is made of an opaque conductive material.

4. The stylus pen for a capacitive touch panel as claimed in claim 1, wherein the center conductor is made of metal or conductive polymer.

5. The stylus pen for a capacitive touch panel as claimed in claim 1, wherein the transparent reinforcing member is made of a transparent plastic-based material.

6. The stylus pen for a capacitive touch panel as claimed in claim 1, wherein the connection portion of center conductor has a cylinder shape and the tip portion has a cone with the top cut shape which decreases in a cross-sectional area from the connection portion toward the touch surface, and
the transparent electrode plate is a circular plate having the same diameter as the cylinder shape of the center conductor.

7. The stylus pen for a capacitive touch panel as claimed in claim 1, further comprising a transparent reinforcing member covering the tip portion of the center conductor, wherein a cylinder shape is achieved by the connection portion of center conductor, the transparent reinforcing member, and the transparent electrode plate.

8. The stylus pen for a capacitive touch panel as claimed in claim 1, wherein at least a portion of the input portion is opaque.

9. A stylus pen for a capacitive touch panel, comprising:
a pen having a body extending longitudinally;
an input portion positioned at one end of the body to provide touch input to the capacitive type touch panel, wherein the input portion comprises:
a center conductor having a connection portion that is combined with the body and a tip portion having a cross-sectional area that is smaller than the cross-sectional area of the connection portion that is connected to the body; and
a transparent electrode plate that is connected to an end of the tip portion of the center conductor opposite an end connected to the connection portion, wherein the transparent electrode plate has a cross-sectional area larger than the tip portion while defining a touch surface; and
a transparent reinforcing member covering the end of the tip portion of the center conductor opposite that of the connection portion,
wherein the transparent reinforcing member has a convex end adjacent to the transparent electrode plate.

* * * * *

UNITED STATES PATENT AND TRADEMARK OFFICE
CERTIFICATE OF CORRECTION

PATENT NO.        : 8,508,510 B2
APPLICATION NO.   : 12/979935
DATED             : August 13, 2013
INVENTOR(S)       : Sang-Uk Kim Page 1 of 1

It is certified that error appears in the above-identified patent and that said Letters Patent is hereby corrected as shown below:

In the Claims

Column 7, Claim 6, line 27        After "of"

Insert -- the --

Column 8, Claim 7, line 4         After "of"

Insert -- the --

Signed and Sealed this
Twenty-fifth Day of November, 2014

Michelle K. Lee
*Deputy Director of the United States Patent and Trademark Office*